United States Patent [19]

Chang

[11] Patent Number: 4,814,768

[45] Date of Patent: Mar. 21, 1989

[54] DOWNHOLE PULSE RADAR

[75] Inventor: Hsi-Tien Chang, Albuquerque, N. Mex.

[73] Assignee: The United States of America as represented by the United States Department of Energy, Washington, D.C.

[21] Appl. No.: 101,536

[22] Filed: Sep. 28, 1987

[51] Int. Cl.$^4$ ............................................. G01S 7/28
[52] U.S. Cl. ........................................ 342/22; 324/333
[58] Field of Search .......................... 342/22, 123, 124; 367/25, 35, 81, 86, 908, 911; 324/323, 333, 338, 346, 355, 368

[56] References Cited

U.S. PATENT DOCUMENTS

| | | | |
|---|---|---|---|
| 2,139,460 | 12/1938 | Potapenko | 342/22 |
| 2,455,941 | 12/1948 | Muskat et al. | 342/22 X |
| 2,544,100 | 3/1951 | Miller | 342/124 |
| 3,286,163 | 11/1966 | Holser et al. | 342/22 X |
| 4,297,699 | 10/1981 | Fowler et al. | 343/5 |
| 4,468,959 | 9/1984 | Roberts | 342/118 X |
| 4,504,833 | 3/1985 | Fowler et al. | 343/5 |
| 4,577,153 | 3/1986 | Stolarczyk | 324/334 |
| 4,581,584 | 4/1986 | Baldwin | 342/22 X |
| 4,621,264 | 11/1986 | Yashiro et al. | 342/124 |
| 4,677,438 | 6/1987 | Michiguchi et al. | 342/22 |
| 4,710,708 | 12/1987 | Rorden et al. | 342/459 X |

OTHER PUBLICATIONS

G. Hawley, "The Condensed Chemical Dictionary," Van Nostrand Reinhold Company, p. 110.
J. Kraus, "The Corner-Reflector Antenna," Proceedings of the I.R.E., Nov., 1940, pp. 513–519.
H. T. Chang et al., "Evaluation of Borehole Electromagnetic and Seismic Detection of Fractures," Sandia Report SAND84-7109, Feb. 1984.
H. T. Chang et al., "Development of a Borehole Directional Antenna at VHF," Sandia Report SAND-84-0254, Mar. 1984.

Primary Examiner—Theodore M. Blum
Assistant Examiner—Bernarr Earl Gregory
Attorney, Agent, or Firm—George H. Libman; James H. Chafin; Judson R. Hightower

[57] ABSTRACT

A borehole logging tool generates a fast rise-time, short duration, high peak-power radar pulse having broad energy distribution between 30 MHz and 300 MHz through a directional transmitting and receiving antennas having barium titanate in the electromagnetically active region to reduce the wavelength to within an order of magnitude of the diameter of the antenna. Radar returns from geological discontinuities are sampled for transmission uphole.

13 Claims, 6 Drawing Sheets

SECTION A-A

(a) TIMING SIGNAL/CLOCK
(b) FAST RAMP AND STAIRCASE SIGNALS
(c) INPUT SIGNAL TO BE SAMPLED
(d) RECONSTRUCTED SIGNAL

DOWNHOLE PULSE RADAR

The United States Government has rights in this invention pursuant to Contract No. DE-AC04-76DP00789 between the Department of Energy and AT&T Technologies, Inc.

BACKGROUND OF THE INVENTION

The present invention relates generally to a radar tool for use in a borehole for locating fractures in a geological formation near the borehole, and more specifically to such a tool having directional transmitting and receiving antennas including barium titanate to couple the antenna to the formation.

A "nonproductive" dry hole constitutes a significant expense in geothermal and petroleum exploration. Accordingly, much research has been undertaken to enable the accurate prediction of subsurface conditions prior to drilling. For example, surface geophysical surveys may be conducted prior to drilling to determine the probability that a reservoir exists in an area. However, the low frequencies used in these surface surveys have limited resolution and cannot identify fine structures such as millimeter-thick fractures in the formation that enable fluids to move through the formation.

Downhole instruments provide more detailed information on the subsurface structure than surface techniques. It is known that an electromagnetic (EM) wave in the 30 MHz-300 MHz range can propagate tens of meters into a formation and provide detectable returns from a fracture. However, the small diameter of a borehole has prevented the use of a directional antenna at the preferred frequency range in the azimuthal angle (on a plane perpendicular to the wellbore). Accordingly, prior measurements have relied on a transmitter and a receiver in different wellbores, to obtain information only about the plane connecting the wellbores. A three dimensional view of an underground formation would require many wellbores, an expensive proposition.

Radar systems with directional antennas that fit a typical wellbore have been developed for frequencies greater than 300 MHz. Unfortunately, the depth of penetration of EM waves at such frequencies is limited. However, a directional system at 30 MHz to 300 MHz would have greater penetration and, therefore, such a system could be used, for example, to guide a drill from a nonproductive dry hole towards nearby fractures.

SUMMARY OF THE INVENTION

It is an object of this invention to provide a directional downhole pulse radar tool operable over a frequency range of 30 MHz-300 MHz.

It is also an object of this invention to provide a downhole pulse radar tool with directional antennas having dielectric-matching material.

It is another object of this invention to provide a downhole pulse radar tool with transmitting and receiving antennas on the same tool.

It is still another object of this invention to provide a downhole pulse radar system that may be continuously operated over a conventional logging cable of a length of 10,000 meters.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a housing for movement within a borehole, the housing containing a pulse radar transmitter, a directional transmitting antenna, a directional receiving antenna, an isolation section separating the two antennas so that the transmitted pulse is not directly received by the receiving antenna, and a receiver for providing an output from the received radar signal. The radar signal contains a broad distribution of power in the range from 30 MHz to 300 MHz. Each antenna consists of a straight radiator and a metal reflective surface parallel to and spaced from the radiator. The electromagnetically active portion of the antenna is filled with a dielectric material to shorten the wavelength so that the antenna will be directional at the desired frequencies. Preferably, this material is a mixture of barium titanate powder and air.

BRIEF DESCRIPTION OF THE DRAWINGS

The accompanying drawings, which are incorporated to and form part of the specification, illustrate an embodiment of the present invention and, together with the description, serve to explain the principles of the invention.

DETAILED DESCRIPTION

Figure 1:
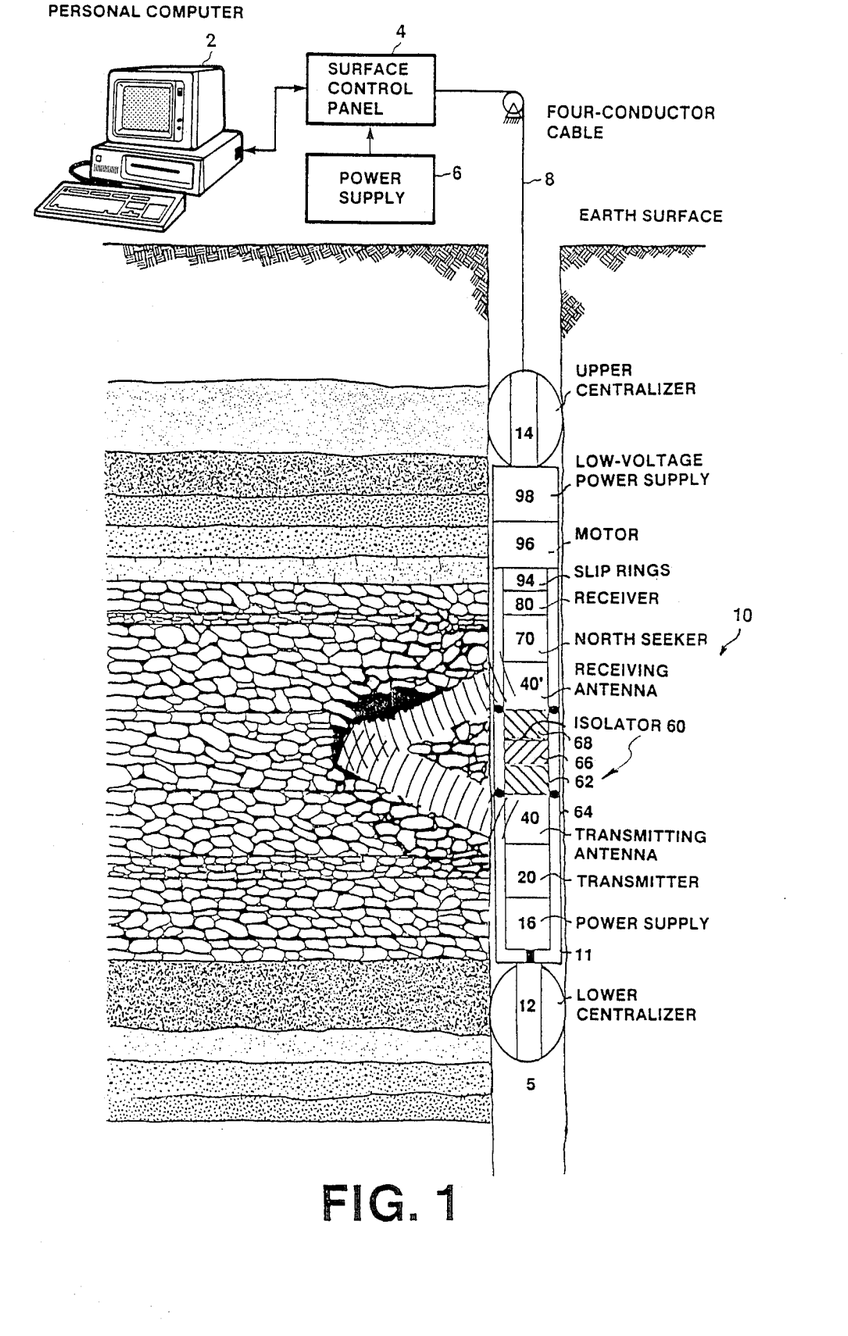
FIG. 1 shows a schematic representation of the invention in a borehole.

The pulse radar system of this invention may best be understood by referring to FIG. 1, which figure shows a downhole radar tool 10 lowered within uncased borehole on a four-conductor cable 8. Uphole equipment includes a power supply 6, a control panel 4 and a computer 2. The particular details of these elements are well known to those of ordinary skill in this art.

In accordance with the preferred embodiment of the invention disclosed herein, radar tool 10 includes a generally cylindrical housing 11 sized for movement within uncased borehole 5. Tool 10 may be centered and stabilized within borehole 5 as well known in the art by an upper centralizer 14 and a lower centralizer 12. Each centralizer typically may include at least three springs (not shown) radially spaced around the circumference of tool 10 for sliding contact with borehole 5.

Tool 10 also may include a direct current high voltage power supply 16 for providing a source of high voltage as is well known in the art. This voltage is applied to a transmitter circuit 20, which circuit, upon receipt of an appropriate signal from the surface, generates a fast rise-time (1–3 ns), short duration (3–12 ns), high power (5–50 kW peak pulse power) pulse at repetition rate that may exceed 10 kHz. Such a signal has a broad distribution of power over a range from 30 MHz to 300 MHz, the frequency band of optimal utilization for this invention. The signal is applied to directional transmitter antenna 40 for transmission into the formation surrounding tool 10. The chosen frequency range propagates tens of meters into a formation and provides detectable radar returns from a fracture or other discontinuity that may be only a millimeter thick (in the direction of wave propagation).

A portion of the transmitted signal is reflected from the formation discontinuity back to directional receiving antenna 40', which antenna may be identical to and is spaced from and directionally aligned with transmitting antenna 40 by an isolator section 60. The function of isolator section 60 is to ensure that the transmitted signal from antenna 40 does not feed directly into receiving antenna 40', thereby overloading the receiving circuits. Although the transmitted signal could be blanked by the receiver circuit as is well known in the radar art, the first return to the receiver using the high power pulse of this invention would be difficult to attenuate using programmable attenuators sized to fit within tool 10. Therefore, sufficient separation between the transmitting and receiving antennas is used to reduce the magnitude of the received transmitter signal.

Isolator section 60 is shown in detail in FIG. 1 to include a length of electrically conductive tube 62 attached between antennas 40 and 40'. Bearings 64 at each end of isolator 60 permit rotation of isolator 60 with respect to housing 11, as discussed hereinafter, and prevent the passage of RF radiation from transmitter antenna 40 to receiving antenna 40' between tube 62 and housing 11. Tube 62 also contains foam rubber RF absorbing rings 66 spaced with thin brass disks 68 to prevent RF penetration through isolator 60.

DC power passes through isolator 60 on heavily filtered power lines (not shown) to ensure isolation between the two antennas in the 30 MHz to 300 MHz frequency range. Fiber optics (not shown) are used to send higher frequency control signals through isolator 60 in a manner well known in the art.

Preferably, isolator 60 should be at least twice as long as each of antennas 40, 40', as the spacing attenuates the received transmitted signal, as discussed above. In addition, since the separation of the antennas is known, the time of the first return will provide a calibration signal for later radar returns from the formation.

The received signals from antenna 40' are sampled and amplified by receiver circuit 80 for transmission uphole, as discussed hereinafter. A band-pass filter may also be used in the receiver circuit 80 to ensure the received wave is restricted to the preferred frequency range.

A flux gate 70 is used to provide an indication uphole as to the azimuthal direction of antenna 40, 40'. Fluxgate 70, which may be a commercially available device such as the Electronic Compass of Humphrey, Inc., provides a DC voltage output indicative of the orientation of the flux gate relative to the earth's North magnetic field. Such a device is conventionally used for this purpose, and the details of the flux gate are not part of this invention.

In order to provide for surface control of the direction of downhole measurement, at least both transmitting antenna 40 and receiving antenna 40', and flux gate 70, are affixed relative to each other for controlled rotation with respect to housing 11. In the present embodiment, each of the tool components shown in FIG. 1 below slip rings 94 is mounted on a section of tool 10 that is controllably rotated with respect to housing 11 by motor 96 at the uphole end of tool 10. In operation, an uphole command to motor 96 rotates the rotatable section while flux gate 70 provides an indication of the direction to which the antennas are pointing for a measurement.

Figure 2:
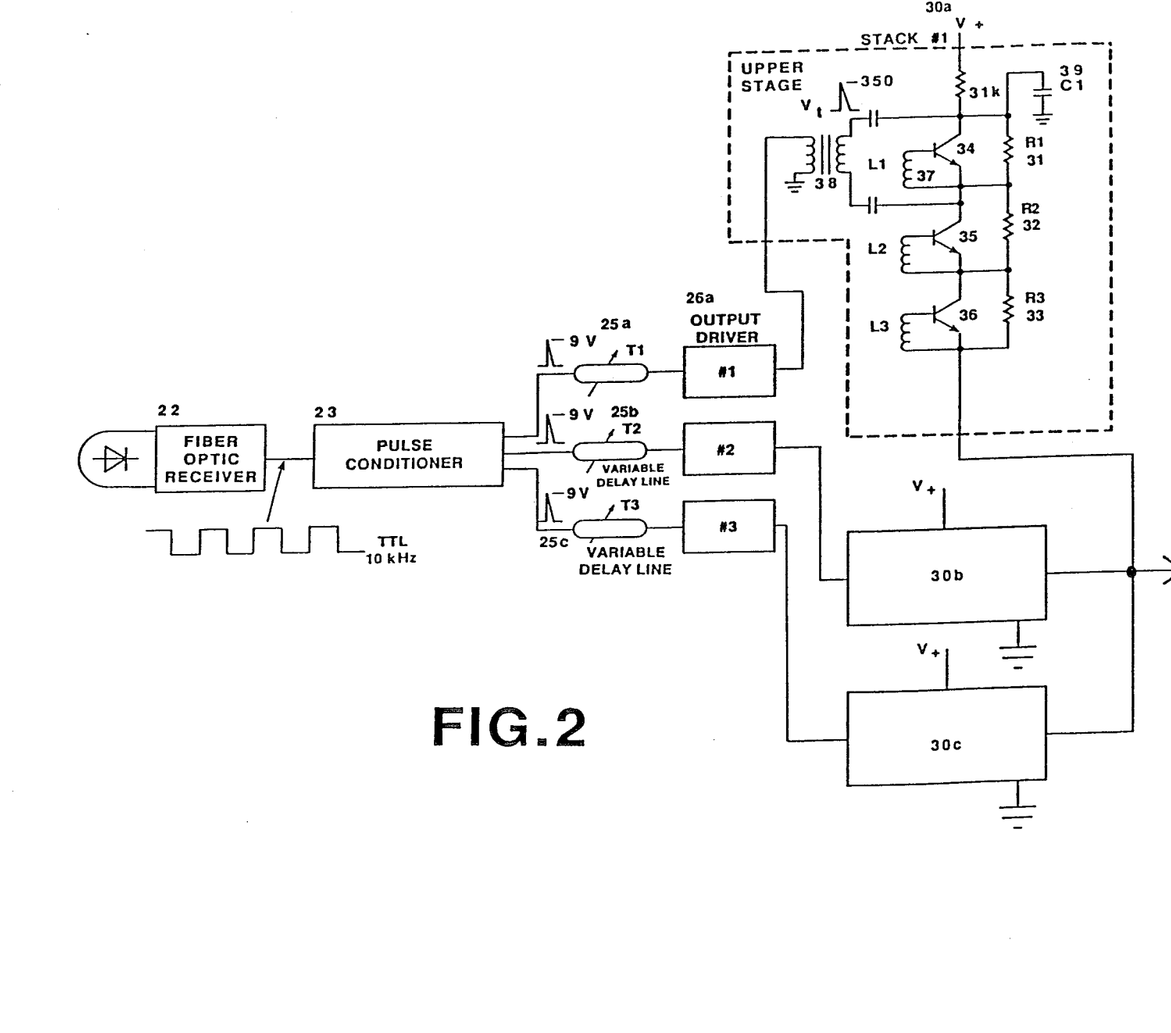
FIG. 2 is a block diagram of the transmitter circuit.

The transmitter section 20 of the preferred embodiment may best be understood by reference to FIG. 2. A synchronizing trigger signal from the receiver circuit is converted into an optical signal at the bottom of receiver circuit 80 to prevent possible pickup of the transmitted pulses in the synchronizing line. This optical signal is received by optic receiver 22 at the transmitter circuit 20 and converted into an impulse by pulse conditioning circuit 23, which circuit may include a pulse shortener and an avalanche driver. The output of circuit 23 is branched into three lines, each line providing an input to an identical output circuit. For simplicity, only one circuit is discussed in detail.

The pulse from circuit 23 passes through a variable delay line 25a to an output avalanche driver 26a that amplifiers the pulse for use as a trigger signal by pulse switch 30a. An input voltage V+ of 1,100 to 1,600 volts is divided by 1.2 Mohm resistors 31, 32, 33 across the three transistors 34, 35, 36. For a BF-622 transistor, the voltage across each transistor (V+/3) is slightly below the breakdown voltage. When the output of driver 26a is stepped up by transformer 38 into a 350 volt pulse at the collector of transistor 34, an avalanche breakdown occurs. Once transistor 34 breaks down, V+ is applied on transistors 35 and 36, and they also break down. Before the breakdown, inductor 37 shorts the transistor base-emitter junction to allow the transistor to withstand a higher voltage. After breakdown, inductor 37 induces a positive voltage across the base-emitter junction to enhance the avalanche breakdown and shorten the rise time and pulse width of the output pulse. Although not shown in the figure, the preferred embodiment also included three additional serially-arranged transistors in each channel to break down.

The outputs of each of channels 30a, 30b, 30c are combined into a pulse output. Delay lines 25a, 25b, 25c are adjusted to ensure that all three parallel lines will break down at the same time, thereby maximizing peak output power.

The characteristics of the output pulse are determined by the breakdown impedance of the transistors, the load impedance, and the values of capacitors 39. A small capacitor value results in faster decay and a shorter pulse width. The circuit was optimized to provide a pulse having a rise time of 1 to 3 ns, a duration from 3 to 12 ns. At a repetition rate of 10 kHz, these pulses contain a broad distribution of power from 30 MHz to 300 MHz to excite antenna 40 and provide the unique measurement capability of this invention.

Figure 3A:
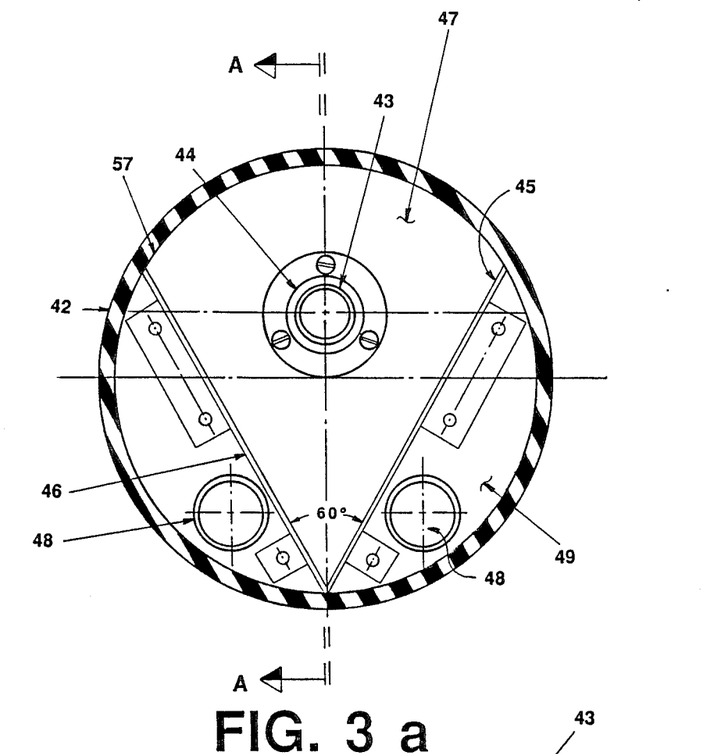
FIGS. 3a and 3b show cut-away views of the antenna of the invention.
Figure 3B:
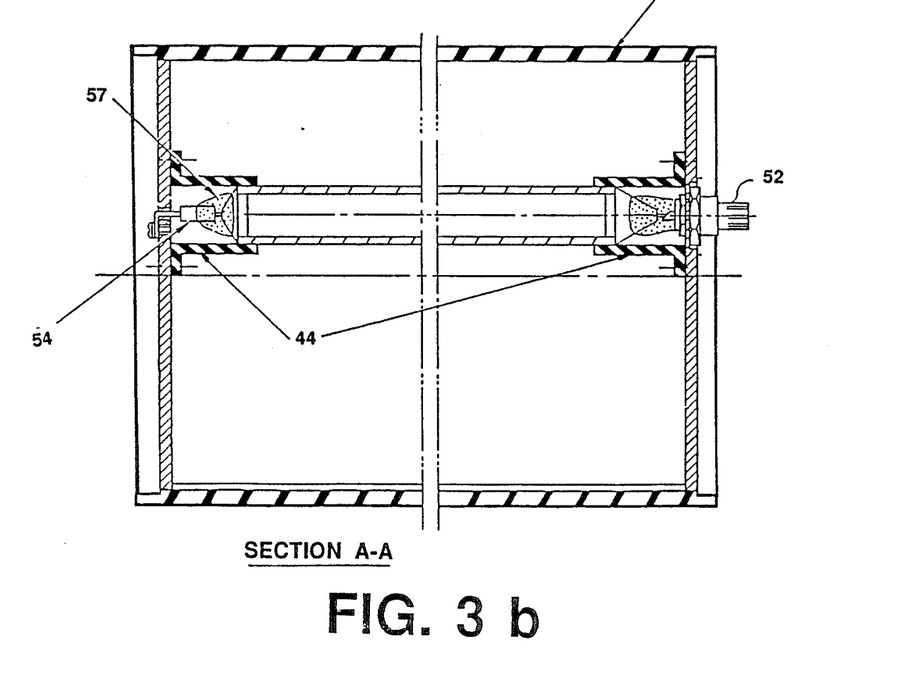

The antenna 40, 40' of this invention are preferably identical and are discussed in detail with reference to FIGS. 3a and 3b, wherein the outer shell of each antenna is a 42 cm length of 15 cm diameter pipe 42 constructed of a plastic material such as phenolic. As shown in FIG. 1, the portion of housing 11 aligned with each antenna is also made of a plastic material. The length of the antenna is chosen to give optimal performance in the desired frequency range. An electrically conductive radiator element 43, preferably extending from an input (or output) connection 52 at one end of antenna 40 (or 40') to a matching impedance 54 at the opposite end, is contained within pipe 42. To handle the high power, radiator element 43 is preferably a 2 cm diameter length of copper pipe fastened to the antenna at each end by an electrically insulated flange 44. For the receiving antenna 40', element 43 could be a length of copper wire, as is known in the art.

A reflective surface for element 43 is also situated within pipe 42. This surface preferably includes two 12 cm wide by 39.5 cm long copper plates 45, 46, positioned along a long edge of each at a 60° angle to define a corner reflector. The angle is bisected by element 43, which element is in the electromagnetically active region 47 of the antenna, as shown in FIG. 3a.

As discussed above, each antenna 40, 40' must be directional over the desired frequency range of 30 MHz to 300 MHz. For a CW signal to be directional, the wavelength of the signal must be of the same order of magnitude, or smaller, than the diameter of the antenna, because the gain of a corner-reflector antenna decreases rapidly as the spacing between element 43 and the reflective plate decreases under 0.5 wavelength, and the width of plates 45, 46 should be at least one wavelength. As the width of plates 45, 46 is constrained by the diameter of the tool to approximately 12 cm, the conventional concept of corner-reflector antennas indicates that a directional downhole antenna for 30 MHz to 300 MHz would be difficult to construct, as the wavelength in water (the downhole medium with the highest dielectric constant and, therefore, the shortest wavelength) for such signals varies from about 111 cm to about 11 cm. However, a waterfilled corner-reflector antenna has been shown to be directional for a pulse containing these frequencies in a downhole environment (H. Chang et al., Development of a Borehole Directional Antenna at VHF, SAND84-0254, 1984).

Water is not a desirable material for a downhole antenna because of the difficulty of containing it and its corrosive nature. Accordingly, in this invention, to achieve a dielectric constant of approximately 80, this material is preferably a mixture of packed barium titanate (BaTiO$_3$) powder and air. Barium titanate is a ferroelectric ceramic with a melting point over 3000° F. A fine powder of barium titanate may be packed into active region 47, the powder particles being surrounded by low dielectric constant air. The dielectric constant of the mixture may be determined using a time domain reflector measurement to determine the reflection time from the antenna terminal, permitting the electromagnetic velocity in the antenna to be calculated and the dielectric constant to be determined.

Although a material in region 47 with a dielectric constant greater than 80 might produce even greater antenna directionality and gain, such a material would also have a greater mis-match with the underground formation. Accordingly, an antenna dielectric constant of 80 is believed to be preferable for this downhole application, although any value of dielectric within the range of 20 to 150 would probably be acceptable.

The volume of the antenna 49 behind reflective plates 45 and 46, which volume is not electromagnetically active in this directional antenna, may be filled with a conductive material such as conductive water gel to absorb possible surface currents on the back side of the reflector. This volume further includes cable routes 48, such as stainless steel tubes extending through the length of the antenna 40, 40' to carry power and fiber optic cables to other parts of tool 10. These tubes also serve as an electrical connection for the ground plane from the uphole to the downhole end of each antenna.

Various connections within the antenna, such as the edge of plate 45 to pipe 42, may be sealed as is well known in the antenna art with an epoxy or other type sealing material such as RTV.

The unique combination of elements of this antenna provides the efficient, directional performance at 30 MHz to 300 MHz needed for the operation of this invention.

Figure 4:
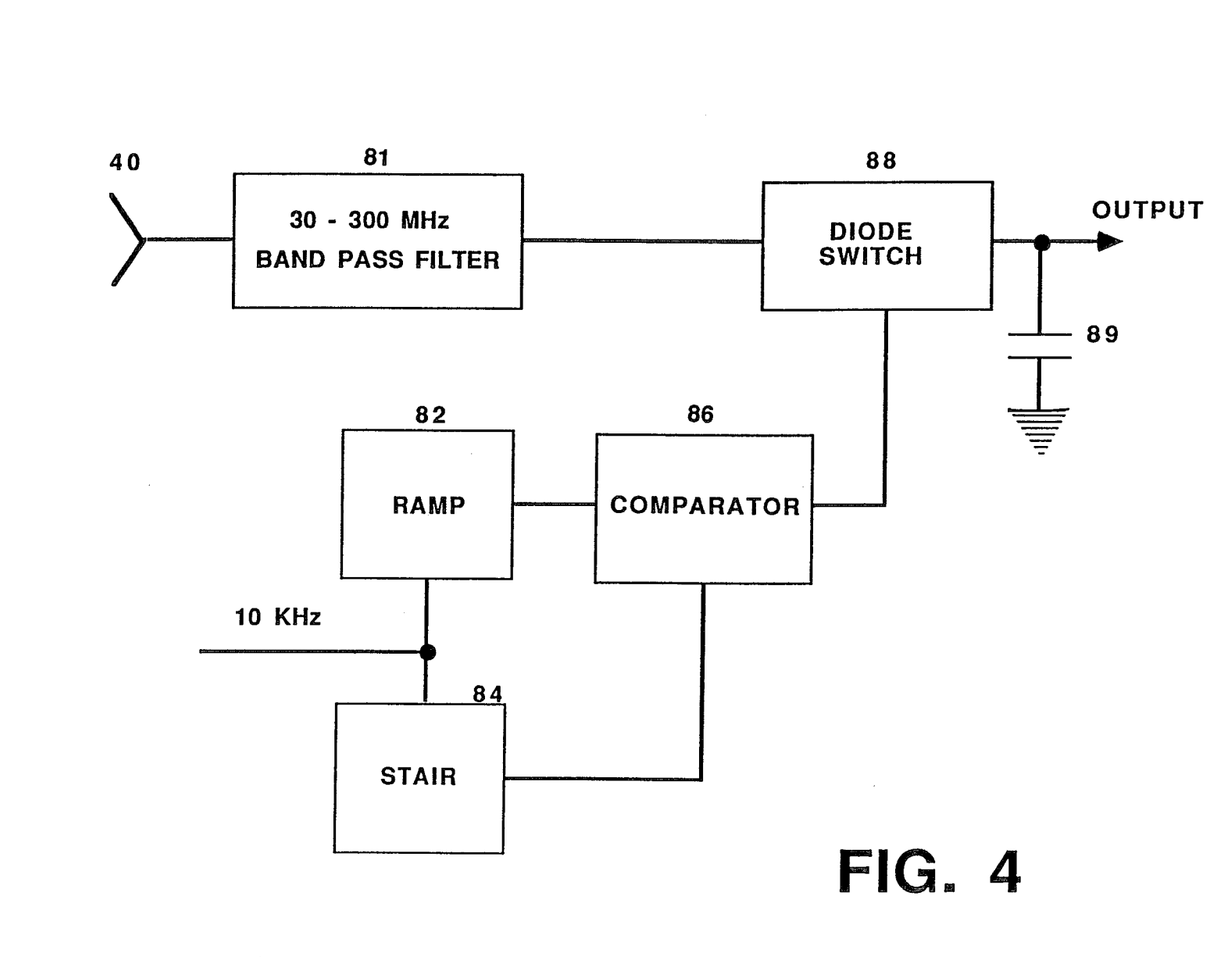
FIG. 4 is a block diagram of the sampling circuit.

Due to the high inductance and capacitance values in most logging cables, it is extremely difficult to transmit RF signals through a long cable to the earth's surface. Accordingly, the received signal is processed by receiver circuit 80 to provide a low frequency signal for transmission uphole. The sampling portion of receiver 80 is shown in FIG. 4.

Receiver 80 includes a ramp generator 82 and a staircase generator 84, each generator being synchronized to the 10 kHz clock used for pulse transmission by transmitter circuit 20. The output of each generator is compared in comparator 86, and a sample control signal generated only while the ramp output equals the staircase output. This sample control signal triggers a diode switch 88, permitting the received RF signal from antenna 40' to be fed through a band-pass filter 81 onto a sampling capacitor 89. This low frequency sampled output may then be amplified and transmitted uphole.

Figure 5:
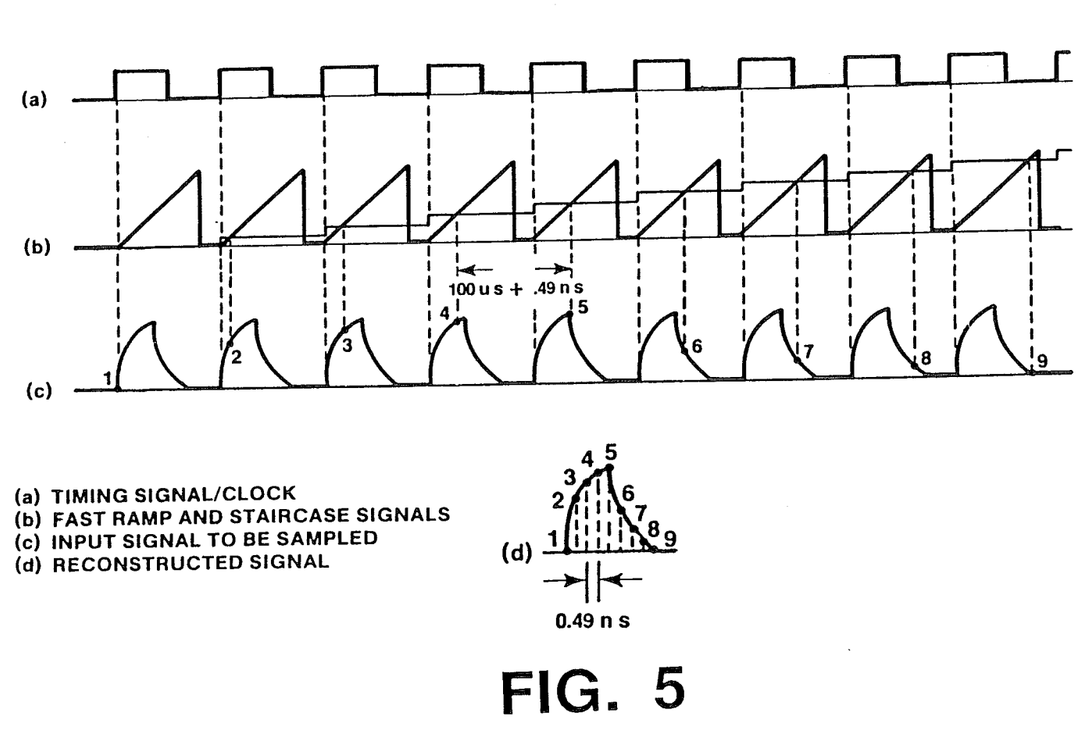
FIG. 5 is a timing diagram showing the output sampling.

Operation of the device may be understood with reference to FIGS. 5a, 5b, 5c, and 5d. FIG. 5a shows the 10 kHz clock pulse with a greatly reduced time scale; the time between pulses being 100 us. FIGS. 5b and 5c show the first 500 ns of each clock pulse; FIG. 5b showing the outputs of the step and ramp generators, FIG. 5c showing the signal received by antenna 40' (suitably amplified). As may be seen in the figure, the intersection of the ramp and step signals is the time where a sample is taken. These samples provide a complete pulse, as shown in FIG. 5d, after 9 samples in this example. In the instant invention, the actual time separation of each sample is 100 us plus 0.49 ns, as shown in FIG. 5c. The waveform formed from these samples in an audio signal that can easily be transmitted through a 10,000 m logging cable without much attenuation. The sample values of the audio waveform are recovered uphole and the signal is reconstructed into the original waveform by shrinking the sampling time back to 0.49 ns as shown in FIG. 5d.

Since the sampled values are not obtained from a single wave form, it is critical that each successive received pulse be substantially identical to the previous pulse. Experiments have been run where received pulses are superposed over one another, showing the variation among sampled pulses to be quite small.

Figure 6:
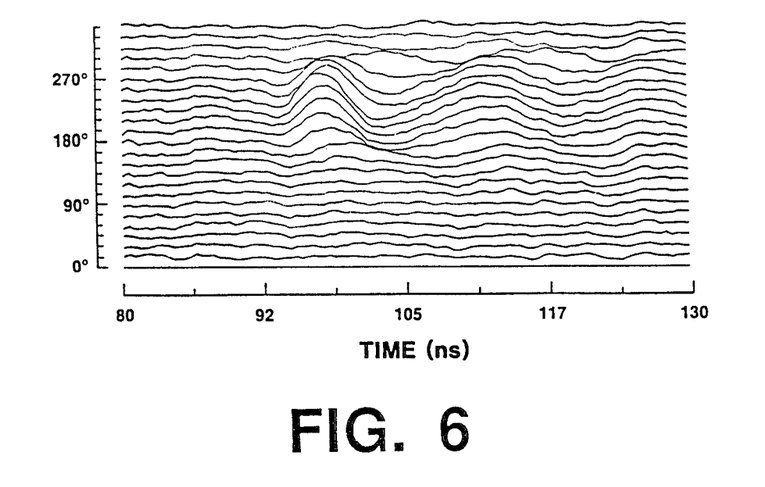
FIG. 6 is a plot of a received signal by the invention.
Figure 7:
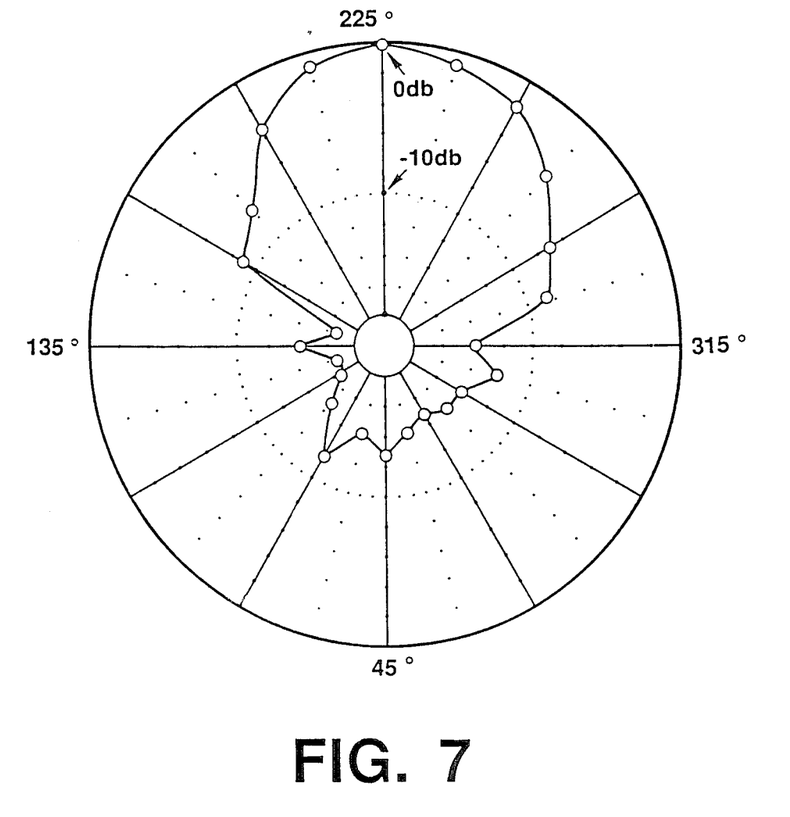
FIG. 7 is a diagram illustrating the antenna's directivity.

The invention has been tested in water to detect a 5 meter wide metal target located about 5 feet from the tool. Such a test simulates a vertical fracture located about 5 feet from a borehole. FIG. 6 shows the recorded traces represented times from 80 to 130 ns after the transmitted pulse. The plot shows about a 2 ns uncertainty in the accuracy of the reflection time. In water, 2 ns corresponds to about 7 cm round trip distance. Therefore, the distance accuracy of the device is on the order of centimeters, enabling fractures to be accurately located. FIG. 7 shows the peak values of the plot of FIG. 6 as a function of azimuthal direction, showing the angular resolution to be as small as 15° for the 60° beam width of the system.

The particular sizes and equipment discussed above are cited merely to illustrate a particular embodiment of this invention. It is contemplated that the use of the invention may involve components having different sizes, shapes, and locations as long as the principle of using a directional antenna system with a dielectric-matching material such as barium titanate at a frequency range of 30 MHz to 300 MHz is followed. For example, other pulse techniques may be used to generate the desired range of power, and other detecting techniques may be used to get the information represented by the received signal to the surface. In addition, the various power supplies and controls may be located either at the surface or on the tool. It is intended that the scope of the invention be defined by the claims appended hereto.

I claim:

1. A downhole radar tool for use with a system for detecting and locating fractures in a geological formation near a borehole, said tool comprising:
   a generally cylindrical housing sized to move within a borehole;
   transmitter means for generating a pulse having a broad distribution of power over the frequency range from 30 MHz to 300 MHz as a pulse radar signal;
   transmitting antenna means, connected to said transmitter means, for transmitting said pulse radar signal from said tool into the geological formation;
   receiving antenna means for receiving a reflected radar signal from said geological formation;
   isolator means for isolating said receiving antenna from said transmitted pulse radar signal; and
   signal processing means for processing the reflected radar signal received by said receiving antenna means;
   wherein each of said transmitting and receiving antenna means is a directional antenna comprising:
     a reflector antenna consisting of a straight radiator and a metal reflective surface parallel to and spaced from said radiator;
     a cylindrical pipe made of electrically insulating material and forming a hollow shell; said reflector antenna being contained within said shell, said radiator being parallel to the axis of said pipe, the volume from an interior surface of said pipe to said reflector including said radiator defining an electromagnetically active region; and
     dielectric material filling said electromagnetically active region, said material having a dielectric constant within the range of 20 to 150.

2. The downhole radar tool of claim 1 wherein the dielectric constant of said material is approximately 80.

3. The downhole radar tool of claim 1 wherein said dielectric matching material consists of barium titanate powder and air.

4. The downhole radar tool of claim 1 wherein said reflector antenna is a corner-reflector antenna having a pair of flat metal reflective sheets intersecting at a corner angle, said radiator being in a plane bisecting said corner angle.

5. The downhole radar tool of claim 4 wherein the corner angle of said corner-reflector antenna is approximately 60 degrees.

6. The downhole radar tool of claim 4 wherein the length of said corner-reflector antenna is approximately equal to the length of said pipe.

7. The downhole radar tool of claim 4 wherein said pair of flat metal reflective sheets each have an outer edge adjacent the interior surface of said pipe at a pair of spaced locations, and inner edges forming the corner angle at a third location adjacent the interior surface of said pipe.

8. the downhole radar tool of claim 7 further comprising means for absorbing surface currents in the volume in said pipe other than said electromagnetically active region.

9. The downhole radar tool of claim 1 wherein said isolator means comprises a length of metal tubing; both of said transmitting and receiving antenna means being oriented in the same direction and separated from each other by said isolator means.

10. The downhole radar tool of claim 9 wherein said isolator means is at least twice as long as each of said antenna means.

11. The downhole radar tool of claim 10 wherein antenna means and said isolator means comprise a rotatable portion of said tool, said tool further comprising:
    means for attaching said tool to a cable for communication to the surface and movement of said tool within the borehole;
    motor means, controllable from the surface, for controllably rotating said rotatable portion of said tool relative to said borehole, whereby said antenna may be directed in any preselected direction.

12. The downhole radar tool of claim 1 wherein said radar pulse has a rise time on the order of 1–3 ns, a pulse width on the order of 3–12 ns, and a repetition rate on the order of 10 kHz.

13. The downhole radar tool of claim 1 wherein said signal processing means includes means for sampling the received radar signal for low frequency transmission uphole.

* * * * *